US008235811B2

(12) United States Patent
Joshi et al.

(10) Patent No.: US 8,235,811 B2
(45) Date of Patent: Aug. 7, 2012

(54) USING PLAYER INFORMATION IN WAGERING GAME ENVIRONMENTS

(75) Inventors: Shridhar P. Joshi, Naperville, IL (US); Candace Lucas, Skokie, IL (US); Alfred Thomas, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 224 days.

(21) Appl. No.: 12/530,998

(22) PCT Filed: Mar. 21, 2008

(86) PCT No.: PCT/US2008/057887

§ 371 (c)(1), (2), (4) Date: Sep. 11, 2009

(87) PCT Pub. No.: WO2008/118800

PCT Pub. Date: Oct. 2, 2008

(65) Prior Publication Data

US 2010/0087247 A1 Apr. 8, 2010

Related U.S. Application Data

(60) Provisional application No. 60/896,769, filed on Mar. 23, 2007.

(51) Int. Cl.
*A63F 13/00* (2006.01)

(52) U.S. Cl. ............................... 463/29; 463/24; 463/42

(58) Field of Classification Search .................... 463/25, 463/29, 42; 705/14, 26
See application file for complete search history.

(56) References Cited

U.S. PATENT DOCUMENTS

| | | | |
|---|---|---|---|
| 5,655,961 | A | 8/1997 | Acres et al. |
| 6,068,552 | A | 5/2000 | Walker et al. |
| 6,106,395 | A | 8/2000 | Begis |
| 6,110,041 | A | 8/2000 | Walker et al. |
| 6,183,366 | B1 | 2/2001 | Goldberg et al. |
| 6,244,958 | B1 | 6/2001 | Acres |
| 6,254,483 | B1 | 7/2001 | Acres |
| 6,317,700 | B1 | 11/2001 | Bagne |
| 6,453,347 | B1 | 9/2002 | Revashetti et al. |
| 6,485,367 | B1 | 11/2002 | Joshi |
| 6,493,637 | B1 | 12/2002 | Steeg |

(Continued)

FOREIGN PATENT DOCUMENTS

EP 1343125 9/2003

(Continued)

OTHER PUBLICATIONS

"PCT Application No. PCT/US2008/057887 International Preliminary Report on Patentability", Aug. 14, 2009 , 12 pages.

(Continued)

*Primary Examiner* — James S McClellan
(74) *Attorney, Agent, or Firm* — DeLizio Gilliam, PLLC

(57) ABSTRACT

Systems and methods for using player information in wagering game environments are described herein. In one embodiment a method includes receiving a first set of player information, where the first set of player information indicates casino activities of a player. The method can also include analyzing the first set of player information and a second set of player information to determine preferences and tendencies associated with the player. The method can also include providing an indication of the preferences and tendencies to wagering game network devices.

23 Claims, 13 Drawing Sheets

U.S. PATENT DOCUMENTS

| | | | | |
|---|---|---|---|---|
| 6,622,084 | B2 | 9/2003 | Cardno et al. | |
| 6,775,664 | B2 | 8/2004 | Lang et al. | |
| 6,871,194 | B1 | 3/2005 | Cardno | |
| 6,884,170 | B2 | 4/2005 | Rowe | |
| 6,960,135 | B2 | 11/2005 | Gaidarev et al. | |
| 7,029,394 | B2 | 4/2006 | Leen et al. | |
| 7,033,276 | B2 | 4/2006 | Walker et al. | |
| 7,158,968 | B2 | 1/2007 | Cardno | |
| 7,186,181 | B2 | 3/2007 | Rowe | |
| 7,221,367 | B2 | 5/2007 | Cardno | |
| 2001/0055990 | A1 | 12/2001 | Acres | |
| 2002/0002075 | A1 | 1/2002 | Rowe | |
| 2002/0174222 | A1 | 11/2002 | Cox | |
| 2003/0003988 | A1 | 1/2003 | Walker et al. | |
| 2003/0182281 | A1 | 9/2003 | Wittkowski | |
| 2003/0216966 | A1 | 11/2003 | Saenz et al. | |
| 2003/0232647 | A1 | 12/2003 | Moser | |
| 2004/0019516 | A1 | 1/2004 | Puskorius et al. | |
| 2004/0024608 | A1 | 2/2004 | Saenz et al. | |
| 2004/0039679 | A1 | 2/2004 | Norton et al. | |
| 2004/0143496 | A1 | 7/2004 | Saenz | |
| 2004/0166940 | A1 | 8/2004 | Rothschild | |
| 2005/0027721 | A1 | 2/2005 | Saenz | |
| 2006/0010022 | A1* | 1/2006 | Kelly et al. | 705/8 |
| 2006/0089873 | A1* | 4/2006 | Stewart et al. | 705/14 |
| 2006/0121972 | A1 | 6/2006 | Walker et al. | |
| 2006/0135264 | A1 | 6/2006 | Shaw et al. | |
| 2007/0121843 | A1* | 5/2007 | Atazky et al. | 379/114.13 |
| 2007/0239552 | A1* | 10/2007 | Sundaresan | 705/26 |

FOREIGN PATENT DOCUMENTS

| | | |
|---|---|---|
| WO | WO-0077682 | 12/2000 |
| WO | WO-0079438 | 12/2000 |
| WO | WO-0104808 | 1/2001 |
| WO | WO-0109765 | 2/2001 |
| WO | WO-0115030 | 3/2001 |
| WO | WO-0122281 | 3/2001 |
| WO | WO-0146851 | 6/2001 |
| WO | WO-0186488 | 11/2001 |
| WO | WO-0186534 | 11/2001 |
| WO | WO-0193099 | 12/2001 |
| WO | WO-0203248 | 1/2002 |
| WO | WO-0207007 | 1/2002 |
| WO | WO-0208954 | 1/2002 |
| WO | WO-0210979 | 2/2002 |
| WO | WO-0215049 | 2/2002 |
| WO | WO-0215525 | 2/2002 |
| WO | WO-0225494 | 3/2002 |
| WO | WO-0242939 | 5/2002 |
| WO | WO-0246964 | 6/2002 |
| WO | WO-02059815 | 8/2002 |
| WO | WO-02067171 | 8/2002 |
| WO | WO-02069192 | 9/2002 |
| WO | WO-02091306 | 11/2002 |
| WO | WO-03012691 | 2/2003 |
| WO | WO-03012713 | 2/2003 |
| WO | WO-03025828 | 3/2003 |
| WO | WO-03073323 | 9/2003 |
| WO | WO-03079232 | 9/2003 |
| WO | WO-03088149 | 10/2003 |
| WO | WO-2004006153 | 1/2004 |
| WO | WO-2004013771 | 2/2004 |

OTHER PUBLICATIONS

"U.S. Appl. No. 10/375,855 Final Office Action", Jan. 30, 2007 , 10 pages.

"U.S. Appl. No. 10/375,855 Final Office Action", May 13, 2009 , 11 pages.

"U.S. Appl. No. 10/375,855 Final Office Action", Aug. 4, 2009 , 11 pages.

"U.S. Appl. No. 10/375,855 Office Action", Sep. 21, 2007 , 10 pages.

"U.S. Appl. No. 10/375,855 Office Action", Aug. 28, 2008 , 8 pages.

"U.S. Appl. No. 10/375,855 Office Action", Sep. 25, 2006 , 7 pages.

"PCT Application No. PCT/US2008/057887 International Search Report", Aug. 4, 2008 , 8 pages.

"VACT Introduces Mariposa, A New Marketing Software Product, At Global Gaming Expo", *Mariposa SoftwareNenture Catalyst Incorporated* Sep. 17, 2002 , 2 pages.

Compton, Jeffrey , "Thinking About Direct Mail", *Strictly Slots* Oct. 2002 , 3 pages.

Nickell, Joe A. , "Welcome to Harrahs", www.business2.com Apr. 2002 , 3 pages.

Rice, John A. , "Mathematical Statistics and Data Analysis", *Wadsworth & Brooks/Cole Advanced Books & Software* (Obtained from the Internet on Mar. 7, 2002) Jun. 1994 , pp. 12-19.

Trochim, William M. , "Inferential Statistics", *Research Methods Knowledge Base* http://www.socialresearchmethods.net/kb/statinf.php (Obtained from the Internet on Aug. 22, 2008) Oct. 20, 2006 (Last Modified) , 2 pages.

* cited by examiner

USING PLAYER INFORMATION IN WAGERING GAME ENVIRONMENTS

RELATED APPLICATIONS

This application claims the priority benefit of U.S. Provisional Application Ser. No. 60/896,769 filed Mar. 23, 2007.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2008, WMS Gaming, Inc.

FIELD

Embodiments of the inventive subject matter relate generally to wagering game networks, and more particularly to processing player information in wagering game networks.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a method comprises receiving a first set of player information, the first set of player information indicating casino activities of a player. The method can also comprise analyzing the first set of player information and a second set of player information to determine preferences and tendencies associated with the player, and providing an indication of the preferences and tendencies to wagering game network devices.

In some embodiments, the second set of player information indicates one or more of the set consisting of the player's friends in an online community, the player's online activities, and promotions chosen by the player.

In some embodiments, the method further comprises analyzing the first and second sets to determine that the player has an acquaintance relationship with another player.

In some embodiments, the method further comprises awarding a transferable promotional offer to the player, wherein the promotional offer is redeemable only if transferred to the other player.

In some embodiments, the analyzing uses one or more of the group consisting of factor analysis, regression analysis, and cluster analysis.

In some embodiments, the wagering game network device from which the first set is received is a wagering game machine.

In some embodiments, the other wagering game network devices are selected from the group consisting of a promotions server, a wagering game server, a management server, and a community server.

In some embodiments, a wagering game network comprises wagering game machines configured to provide a first set of player information, wherein the first set of player information indicates choices made by players during a wagering game. The wagering game network can also include a community server configured to provide a second set of player information, wherein the second set of player information indicates online community activities of the players and relationships between the players. The wagering game network can also include a player information server configured to analyze the first and second sets of player information and other player information, wherein the analysis indicates wagering game content preferences associated with the players and relationships between certain of the players.

In some embodiments, the player information server is further configured to distribute the preferences and relationships to devices in the wagering game network.

In some embodiments, the wagering game network further comprises a player service device to provide player information to the player information server.

In some embodiments, the wagering game network further comprises a wagering game server configured to provide wagering game content to the wagering game machines based on the preferences and relationships.

In some embodiments, the wagering game network further comprises a promotions server configured to create promotions for the players based on the preferences and relationships.

In some embodiments, the promotions include one or more selected from the group consisting of electronic coupons, wagering game betting options, and in-person casino services.

In some embodiments, the relationships include one or more from the group consisting of friend/acquaintance relationships and influence relationships.

In some embodiments, the first set of player information also indicated movements of one or more of the players in a casino.

In some embodiments, a machine-readable medium includes instructions executable by a machine, the instructions including first instructions to analyze information associated with a wagering game player, the information indicating choices the player made in response to offers, wherein the analysis identifies wagering game content to offer the player, and second instructions to notify a wagering game network device about the wagering game content.

In some embodiments, the information further indicates game elements selected by the player during a wagering game.

In some embodiments, the analysis also identifies promotions to offer the player.

In some embodiments, the machine readable medium further comprises third instructions to receive the information from a wagering game machine.

In some embodiments, the machine readable medium further comprises third instructions to analyze the information and information from an online community to identify relationships between the player and other players.

In some embodiments, the analysis also identifies one or more of the group consisting of in-person casino services to offer the player, online community activities to offer the player, relationships with other, and activities outside a casino to offer the player.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes an example operating environment. The third section describes example operations performed by some embodiments and the fourth section describes example wagering game machines in more detail. The fifth section presents some general comments.

Introduction

This section provides an introduction to some embodiments of the invention.

When players interact with wagering game machines and other wagering game network facilities, they participate in activities and make choices that reveal their preferences, aversions, and tendencies. For example, players may: 1) frequently play one specific wagering game, 2) play only low-limit machines, 3) play portable gaming terminals more often than stationary machines, 4) associate with specific players in an online wagering game community, 5) choose certain promotional options, while ignoring others, 6) etc. Some embodiments of the invention analyze these choices and activities to determine what gaming and promotion offers are likely to be attractive to particular players. For example, if a player frequently participates in a web-based discussion group about poker, the player may be attracted to a promotion that awards credits for use on a casino's video poker machines. Similarly, if a player frequently bets in a casino's sports book, the player may enjoy sports-related themes for various wagering games (e.g., a video slots game in which the reels show a team logo). By recording and analyzing player choices and activities, casino operators can identify yet undiscovered factors that enhance players' experiences.

Figure 1:
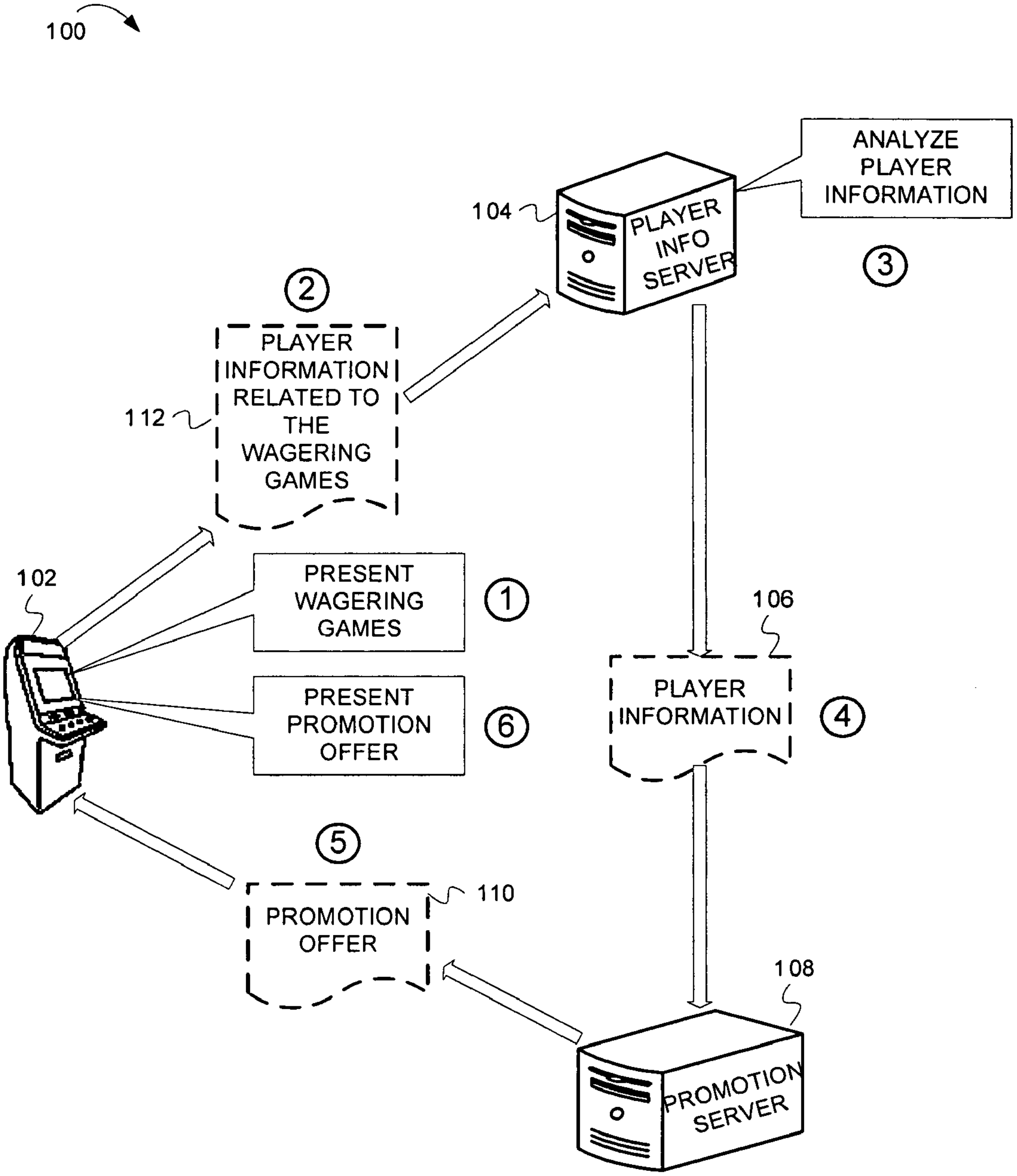
FIG. 1 is a dataflow diagram illustrating dataflow and operations attendant to processing and analyzing player information, according to some embodiments of the invention.

FIG. 1 is a dataflow diagram illustrating dataflow and operations attendant to processing and analyzing player information, according to some embodiments of the invention. In FIG. 1, the wagering game network 100 includes a wagering game machine 102, player information server 104, and promotions server 108. The operations and dataflow occurs in six stages.

During stage one, the wagering game machine 102 presents wagering games (e.g., slots or video poker) to a player (not shown). During stage two, the wagering game machine 102 transmits wagering-game-related player information 112 to the player information server 104. The wagering-game-related player information 112 can indicate information about specific wagering games. For example, the information can indicate how many times the player attempted to win large long-odds jackpots over smaller jackpots with better odds. The player information server 104 can store the player information 112 and associate it with the player's player identifier.

During stage three, the player information server 104 analyzes player information associated with the player to identify factors that are likely to enhance the player's gaming experience. The player information server 104 can analyze the player information 112 using any suitable analysis techniques, such as regression analysis, factor analysis, cluster analysis, etc. During stage four, the player information server 104 transmits player information 106 to the promotions server 108. The player information 106 can identify factors that may enhance the player's gaming experience. For example, the player information 106 can indicate that the player will likely value a low-cost opportunity to substantially increase a game's jackpot.

During stage five, using the player information 106, the promotions server 108 formulates a promotion offer 110 and transmits it to the wagering game machine 102. During stage six, the wagering game machine 102 presents the promotion offer to the player, where the player can accept or reject the offer. For example, the wagering game machine 102 offers the player an option to double the game's jackpot for one gaming credit.

Although FIG. 1 describes some embodiments, the following sections describe many other features and embodiments.

Operating Environment

This section describes an example operating environment and presents structural aspects of some embodiments. This section includes discussion about wagering game networks and wagering game network device architectures. Any of the components described below can include hardware, firmware, and/or machine-readable media including instructions for performing the operations described herein. Furthermore, any of the components described below can be integrated or divided.

Wagering Game Networks

Figure 2:
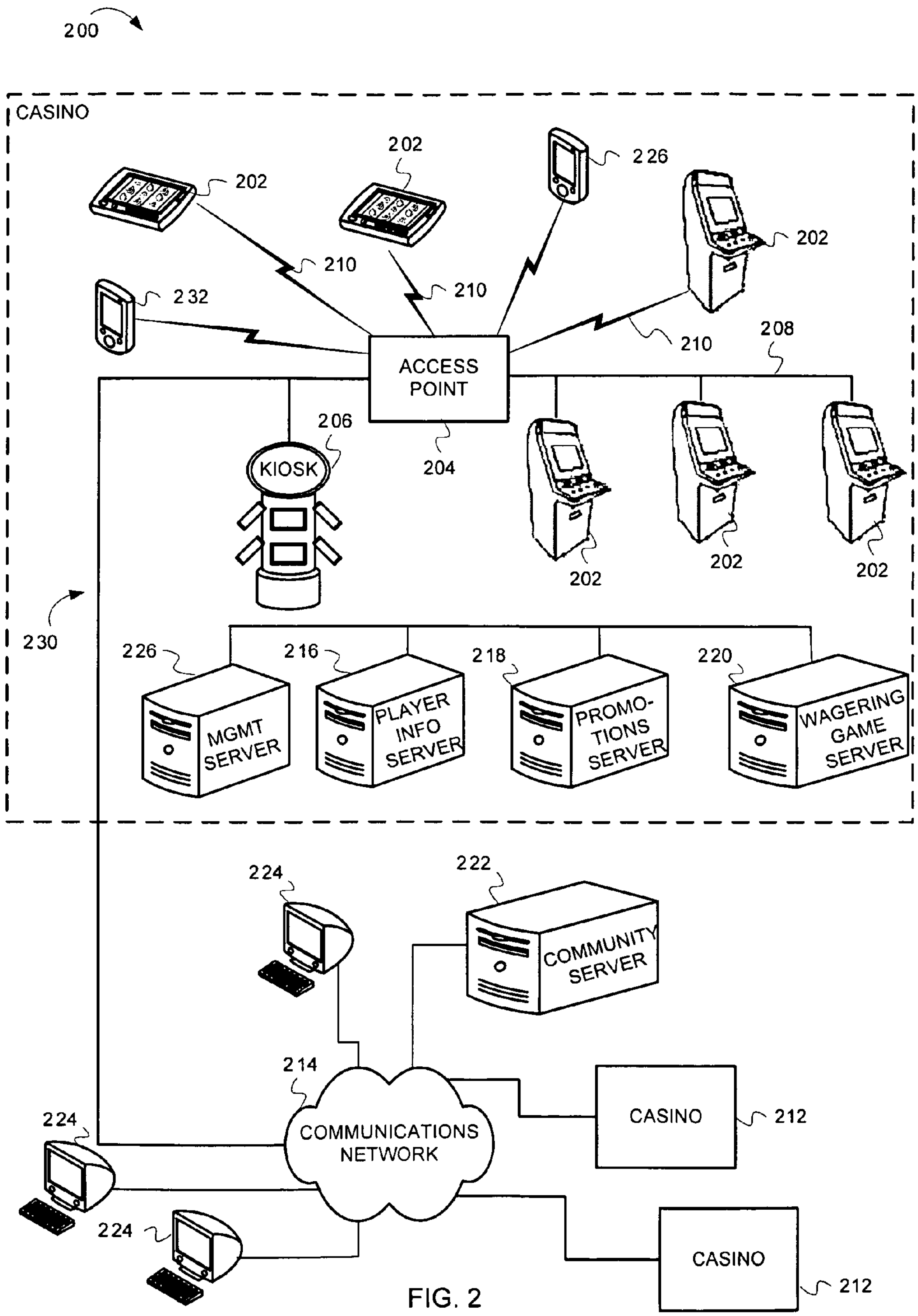
FIG. 2 is a block diagram illustrating a wagering game network, according to some embodiments of the invention.

FIG. 2 is a block diagram illustrating a wagering game network, according to some embodiments of the invention. As shown in FIG. 2, the wagering game network 200 includes a community server 222, community terminals 224, and casinos 212, all connected via a communications network 214.

The community server 222 can provide a wide range of services to members of virtual communities (see the Virtual Communities subsection below). In some embodiments, the community server 222 can enable community members who are online to interact with each other and with community members who are in the casinos 212. The community terminals 224 can enable community members to access virtual communities and other services available from the community server 222 and other network components. The community terminals 224 can include personal computers, workstations, personal digital assistants, or other computing devices. In some embodiments, the community terminals 224 can wirelessly connect to the communications network 214.

Each casino 212 includes a local area network 230, which includes an access point 204, wagering game machines 202, player service devices 232, wagering game server 220, promotions server 218, player information server 216, and management server 226. While FIG. 2 shows the servers 226, 216, 218, & 222 as separate components, they can be integrated into a single machine. The access point 204 provides wireless communication links 210 and wired communication links 208. The wired and wireless communication links can employ any suitable connection technology, such as Bluetooth, 802.11, Ethernet, public switched telephone networks, SONET, etc.

The wagering game server 220 can serve wagering games and/or other content to the wagering game machines 202, whereas the player information server 216 can track, analyze, and disseminate player information. The player information server 216 can receive/deliver player information from/to any component of the wagering game network 200. As a result, player information can indicate numerous player preferences, associations, choices, activities, and tendencies. The promotions server 218 can use the player information to tailor promotions (e.g., electronic coupons) for specific players and distribute the promotions over the wagering game network 200. The management server 226 can enable casino managers to configure components of the LAN 230. In some embodiments, the management server 226 offers a digital dashboard that presents player information about players in the casino 212. Casino managers can use the player information to dispatch in-person service offers that will likely enhance players' gaming experiences.

The wagering game machines 202 described herein can take any suitable form, such as floor standing models, handheld mobile units, bartop models, workstation-type console models, etc. Further, the wagering game machines 202 can be primarily dedicated for use in conducting wagering games, or can include non-dedicated devices, such as mobile phones, personal digital assistants, personal computers, etc. In some embodiments, wagering game machines 202 and wagering game servers 206 work together such that a wagering game machine 202 can be operated as a thin, thick, or intermediate client. For example, one or more elements of game play may be controlled by the wagering game machine 202 (client) or the wagering game server 220 (server). Game play elements can include executable game code, lookup tables, configuration files, game outcome, audio or visual representations of the game, game assets or the like. In a thin-client example, the wagering game server 220 can perform functions such as determining game outcome or managing assets, while the wagering game machine 202 can present a graphical representation of such outcome or asset modification to the user (e.g., player). In a thick-client example, the wagering game machines 202 can determine game outcomes and communicate the outcomes to the wagering game server 220 for recording or managing a player's account.

In some embodiments, either the wagering game machines 202 (client) or the wagering game server 220 can provide functionality that is not directly related to game play. For example, account transactions and account rules may be managed centrally (e.g., by the wagering game server 220) or locally (e.g., by the wagering game machine 202). Other functionality not directly related to game play may include power management, presentation of advertising, software or firmware updates, system quality or security checks, etc.

The player service devices 232 can provide player information (e.g., a player identifier and information about the player's location and activities) to the player information server 216 and other network devices. Additionally, the player services devices 226 can work in concert with the promotions server 218 to assist players with technical support, concierge services, hotel services, etc.

Any of the components of the wagering game network 200 can include hardware and machine-readable media including instructions for facilitating the virtual community features noted above. For example, the community server 222 can include software for hosting virtual community web sites, facilitating communications between community members (e.g., players), facilitating interactions between members who are online and members who are in casinos, and reporting choices and activities of community members (i.e., community-related player information). The wagering game network 200 can also include other network devices, such as accounting servers, wide area progressive servers, player tracking servers, and/or other devices suitable for use in connection with embodiments of the invention.

This section continues with a discussion about some components of a wagering game network.

Player Information Server

Figure 3:
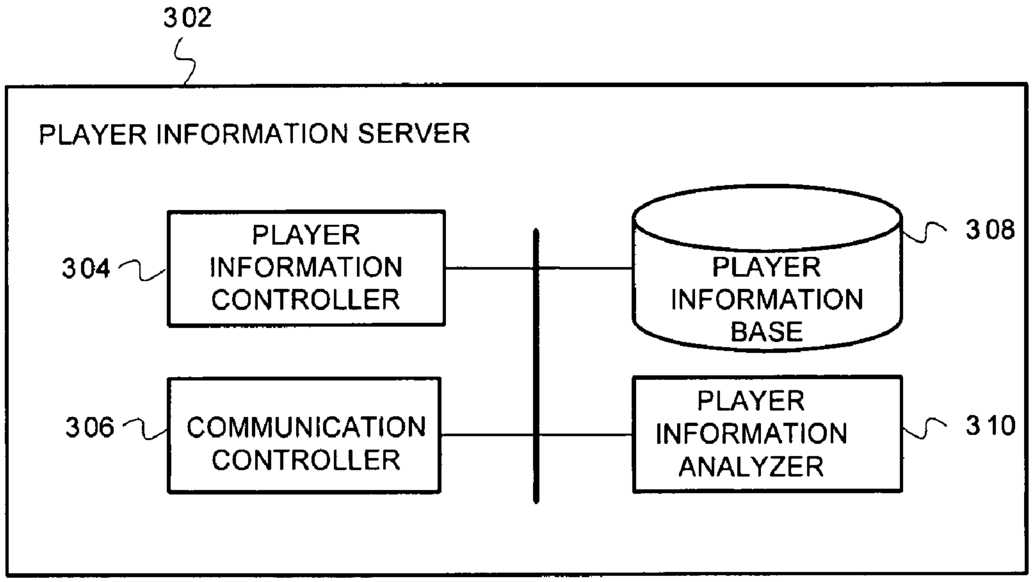
FIG. 3 is a block diagram illustrating a player information server, according to some embodiments of the invention.

FIG. 3 is a block diagram illustrating a player information server, according to some embodiments of the invention. In FIG. 3, the player information server 302 includes a player information controller 304, communication controller 306, player information base 308, and player information analyzer 310. The player information controller 304 can control transmission and receipt of player information to and from wagering game network devices. The communication controller 306 can assist the player information controller 304 in transmitting and receiving player information over a network.

The player information base 308 stores player information. The player information base 308 can include relational databases, flat databases, file systems, and/or any other suitable data storage structures. The player information analyzer ("analyzer") 310 can analyze the player information to reveal player preferences, player tendencies, relationships between players, etc. The analyzer 310 can employ regression analysis, cluster analysis, factor analysis, or any other suitable analysis technique. As the analysis reveals new information, the analyzer 310 can store the new information in the player information base 308.

As noted above, embodiments of the player information server can exchange player information with various wagering game network devices.

Figure 4:
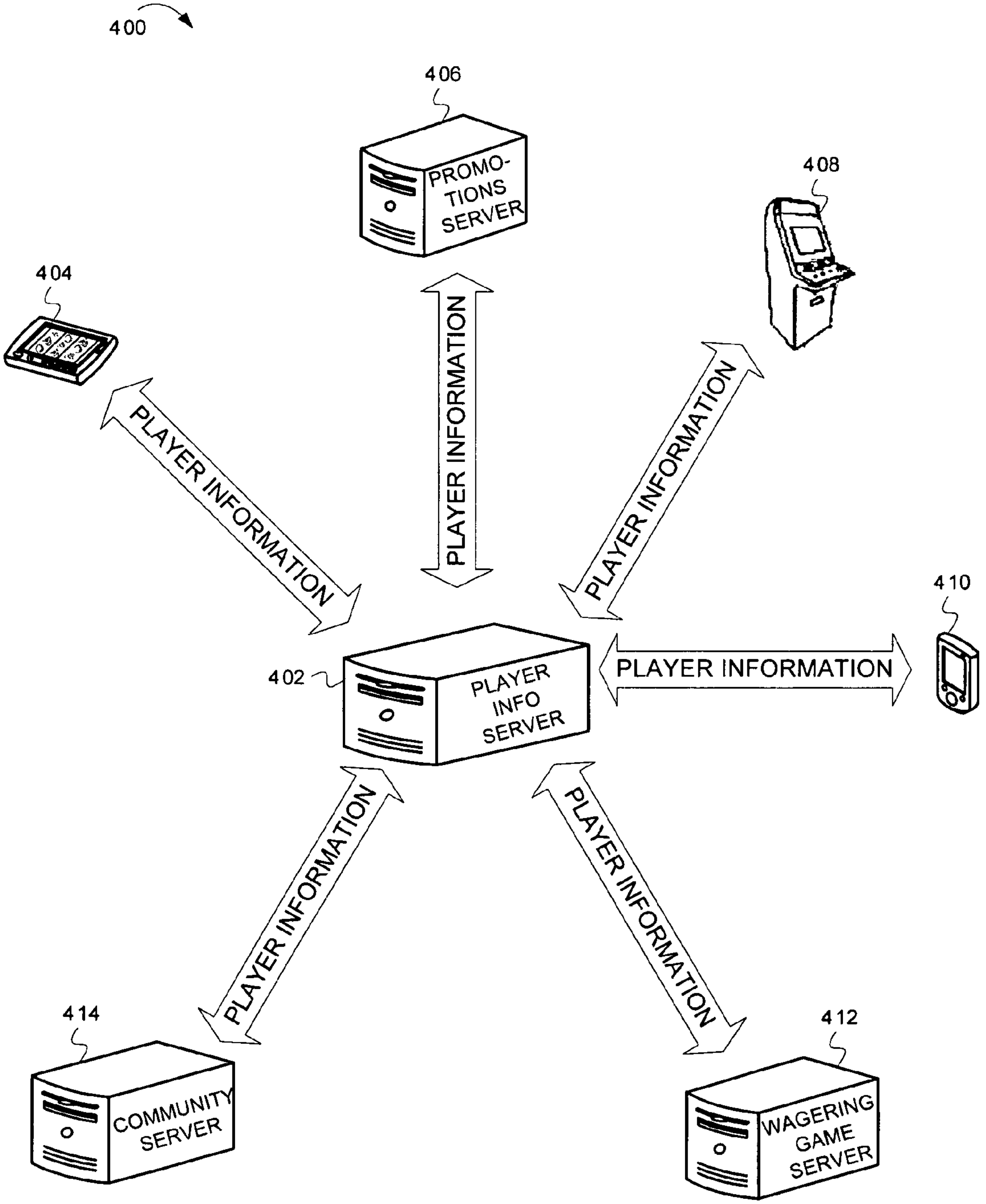
FIG. 4 shows some devices with which the player information server can exchange player information, according to some embodiments of the invention.

FIG. 4 shows some devices with which the player information server can exchange player information, according to some embodiments of the invention. As shown in FIG. 4, some embodiments of a player information server 402 can exchange player information with mobile wagering game machines 404, promotions servers 406, freestanding wagering game machines 408, player service devices 410 wagering game servers 412, and community servers 414. Because these wagering game network devices offer a broad array of functionality (see below), they can collect a wide range of player information. In some embodiments, the player information can include:

- Online-Related Player Information—This can include information about players' activities in an online community, web-based gaming environment, or other online environment. Online-related player information can include friends lists, web content reviews, games played, game settings/preferences, promotions selected, and more.
- Casino-Related Player Information—This can also include information about players' activities in a casino. This information can indicate what table games specific players have played, player movements in a casino, activities booked through a casino, etc. Casino-related player information can include wagering-game-related player information, which can indicate choices made while playing wagering games. For example, wagering-game-related player information can indicate bets, game element selections (e.g., playing card selections), velocity of play, etc.
- Outside Player Information—Players can participate in activities that are not monitored by components of a wagering game network. However, the casino or some other entity may provide information about the players' activities. The outside player information can include information about players' shopping habits, vacations, demographic information, hobbies, etc.

Every type of player information can include time-related data. For example, casino-related player information can indicate what choices a player made and when the player made the choices. As another example, casino-related player information can indicate times associated with player movements. Some wagering game network devices can leverage the time-related data to formulate high-impact offers in real-time.

Virtual Communities & Community Servers

Virtual communities ("communities") include groups of people who choose to associate and interact with each other via web sites, chat rooms, newsgroups, email, discussion boards or forums, instant messaging, and/or other electronic facilities. Members of a community often share a set of common interests and experience (e.g., an interest in a particular wagering game). According to embodiments, communities offer a rich infrastructure which enables community members to:

- Create Social Networks—When creating social networks, members can create electronic associations that inform network members when selected members are: 1) online, 2) performing activities, 3) reaching milestones, 4) etc.
- Establish a Reputation—Community members can establish reputations based on feedback from other community members, based on accomplishments in the community, based on who is in their social network, etc.
- Provide Content—Community members can provide content by uploading media, designing wagering games, maintaining blogs, etc.
- Filter Content—Community members can filter content by rating content, commenting on content, or otherwise distinguishing content.
- Interact with Other Members—Community members can interact via newsgroups, e-mail, discussion boards, instant messaging, etc.
- Participate in Community Activities—Community members can participate in community activities, such as multi-player games, interactive meetings, discussion groups, real-life meetings, etc.

Figure 5:
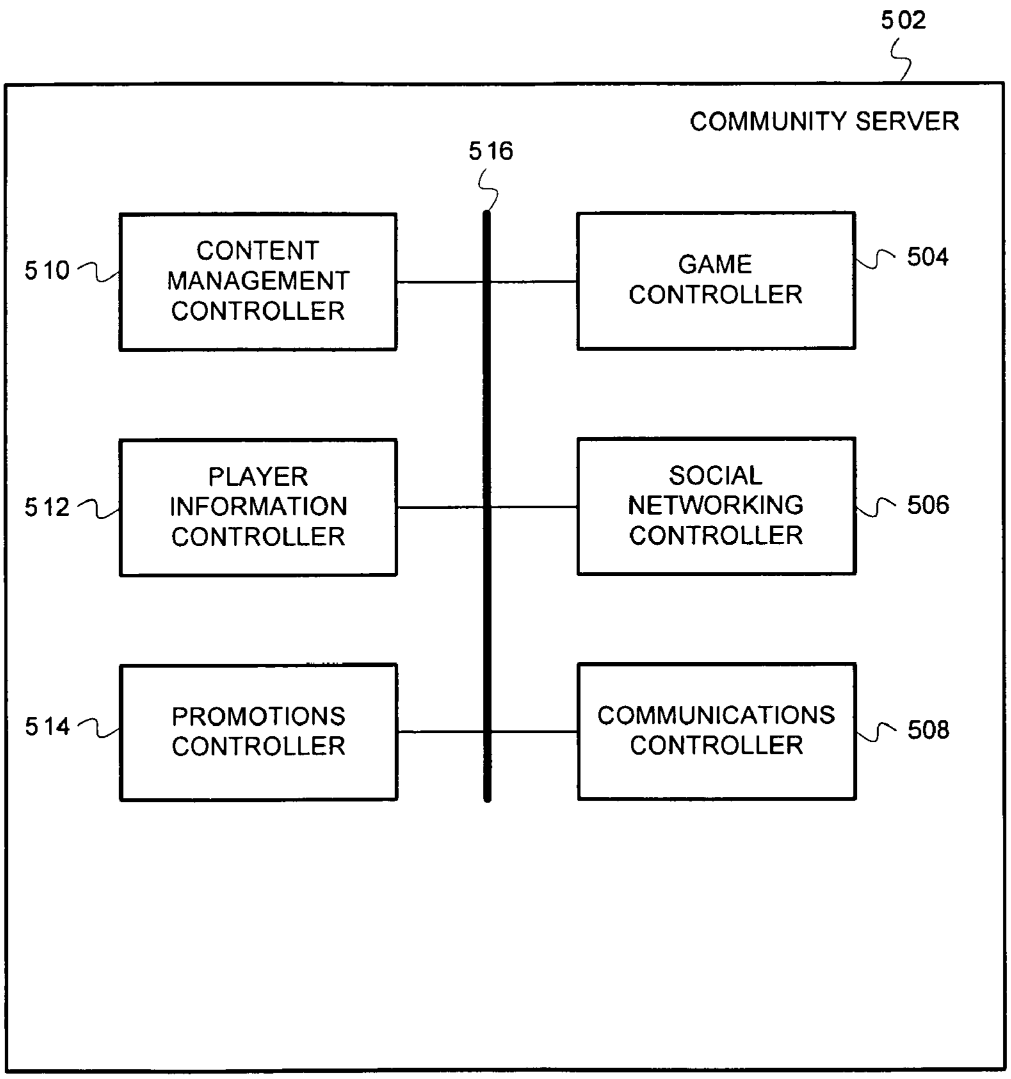
FIG. 5 is a block diagram illustrating a community server, according to some embodiments of the invention.

FIG. 5 is a block diagram illustrating a community server, according to some embodiments of the invention. In FIG. 5, the community server 502 includes a game controller 504, social networking controller 506, communications controller 508, content management controller 510, player information controller 512, and promotions controller 514. The community server's components can communicate with each other via the communication interface 516, which can include buses, wires, software interfaces, and/or any other suitable interface technology.

The game controller 504 can conduct non-wagering games based on input received from the community terminals 224. The game controller 504 can also facilitate interactions between the community terminals 224 and the wagering game server 220 and/or wagering game machines 202. In some embodiments, the game controller 504 enables online community members to participate in and/or monitor wagering games that are being presented in the casinos 212.

The social networking controller ("networking controller) 506 can enable community members to connect with and track each other. For example, the networking controller 506 can enable community members to select other members to be part of a social network. The networking controller 506 can also enable members of a social network to track what other social network members are doing in a virtual community and a real-world casino. For example, in some embodiments, the networking controller 506 assists in enabling members of a social network to see when network members are playing wagering game machines in a casino, accessing a virtual community web site, achieving milestones (e.g., winning large wagers in a casino), etc.

The communications controller 508 can enable community members to communicate with each other. For example, the communications controller 508 can facilitate e-mail, instant messaging, message boards, and other suitable communication channels. In some embodiments, the communications controller 508 can facilitate delivery of messages between the community terminals 224 and the wagering game machines 202. In some embodiments, the communications controller 508 provides menu-driven messaging options that reduce input (e.g., typing) needed to represent a member's thoughts/expression. In some embodiments, the communications controller 508 learns a player's communication style and provides menu-driven messaging options suited to the player's communication style. Additionally, the communication controller 508 can provide a "quick text" interface that streamlines text input.

The content management controller 510 can store and manage content for a virtual community. For example, in some embodiments, the content management controller 510 can host a web site for a virtual community. Additionally, it can enable community members and administrators to add, delete, and/or modify content for virtual communities. For example, the content management controller 510 can enable community members to post media files, member-designed games, commentaries, etc., all for consumption by members of a virtual community.

The player information controller 512 can track behavior (e.g., choices, activities, etc.) of community members. In some embodiments, the player information controller 512 compiles player information indicating how individuals and/or groups use the services and content available in a virtual community. The player information controller 512 can report the player information to one or more player information servers. In some embodiments, the content management controller 510 can customize content based on individual and/or group preferences, habits, and activities.

The promotions controller 514 can manage various promotions offered to members of a virtual community. For example, the promotions controller 514 can distribute promotional material when members achieve certain accomplishments (e.g., scores for online games) in a virtual community. Members may use some of the promotional material when playing wagering games in a casino. In some embodiments, the promotions controller 514 formulates some promotions based on player information received from a player information server.

Wagering Game Machines

Figure 6:
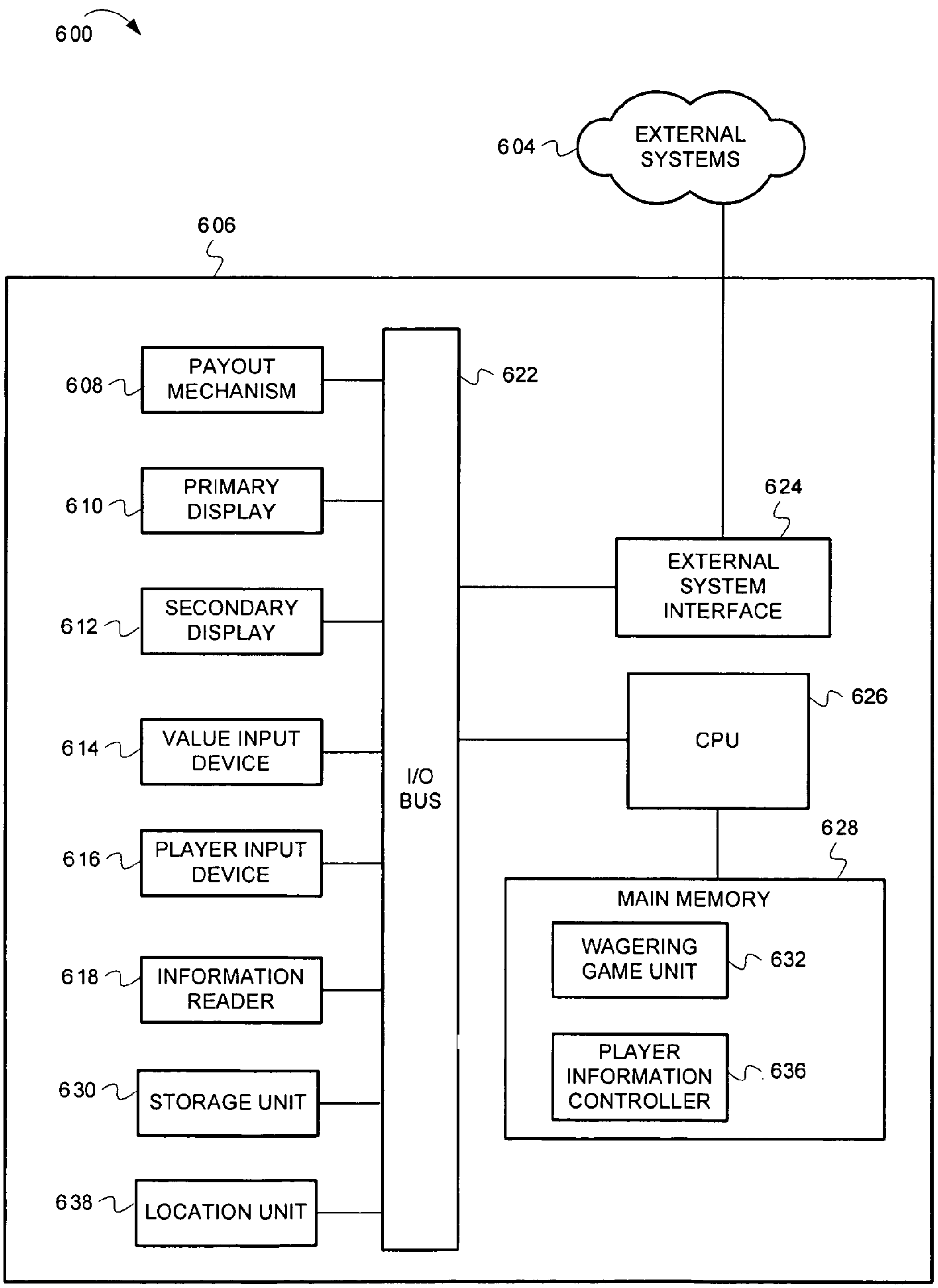
FIG. 6 is a block diagram illustrating a wagering game machine architecture, according to some embodiments of the invention.

FIG. 6 is a block diagram illustrating a wagering game machine architecture, according to some embodiments of the invention. As shown in FIG. 6, the wagering game machine architecture 600 includes a wagering game machine 606, which includes a central processing unit (CPU) 626 connected to main memory 628. The CPU 626 can include any suitable processor, such as an Intel® Pentium processor, Intel® Core 2 Duo processor, AMD Opteron™ processor, or UltraSPARC processor.

The main memory 628 includes a wagering game unit 632 that can present wagering games, in whole or part. The main memory 628 also includes a player information controller 636. In some embodiments, the player information controller 636 can transmit player information to a patron services server or other device. The player information can include information about wagering games, virtual community activities, player movements, etc.

The CPU 626 is connected to an input/output (I/O) bus 622, which can include any suitable bus technologies, such as an AGTL+ frontside bus and a PCI backside bus. The I/O bus 622 is connected to a payout mechanism 608, primary display 610, secondary display 612, value input device 614, player input device 616, information reader 618, storage unit 630, and location unit 638. The player input device 616 can include the value input device 614 to the extent the player input device 616 is used to place wagers. The I/O bus 622 is also connected to an external system interface 624, which is connected to external systems 604 (e.g., wagering game networks). The external system interface 624 can include logic for exchanging information over wired and wireless networks (e.g., 802.11g transceiver, Bluetooth transceiver, Ethernet transceiver, etc.)

The I/O bus 622 is also connected to a location unit 638. The location unit 638 can create player information that indicates the wagering game machine's location/movements in a casino. In some embodiments, the location unit 638 includes a global positioning system (GPS) receiver that can determine the wagering game machine's location using GPS satellites. In other embodiments, the location unit 638 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 6, in some embodiments, the location unit 638 is not connected to the I/O bus 622.

In some embodiments, the wagering game machine 606 can include additional peripheral devices and/or more than one of each component shown in FIG. 6. For example, in some embodiments, the wagering game machine 606 can include multiple external system interfaces 624 and/or multiple CPUs 626. In some embodiments, any of the components can be integrated or subdivided.

This section continues with a discussion about player service devices.

Player Service Devices

Figure 7:
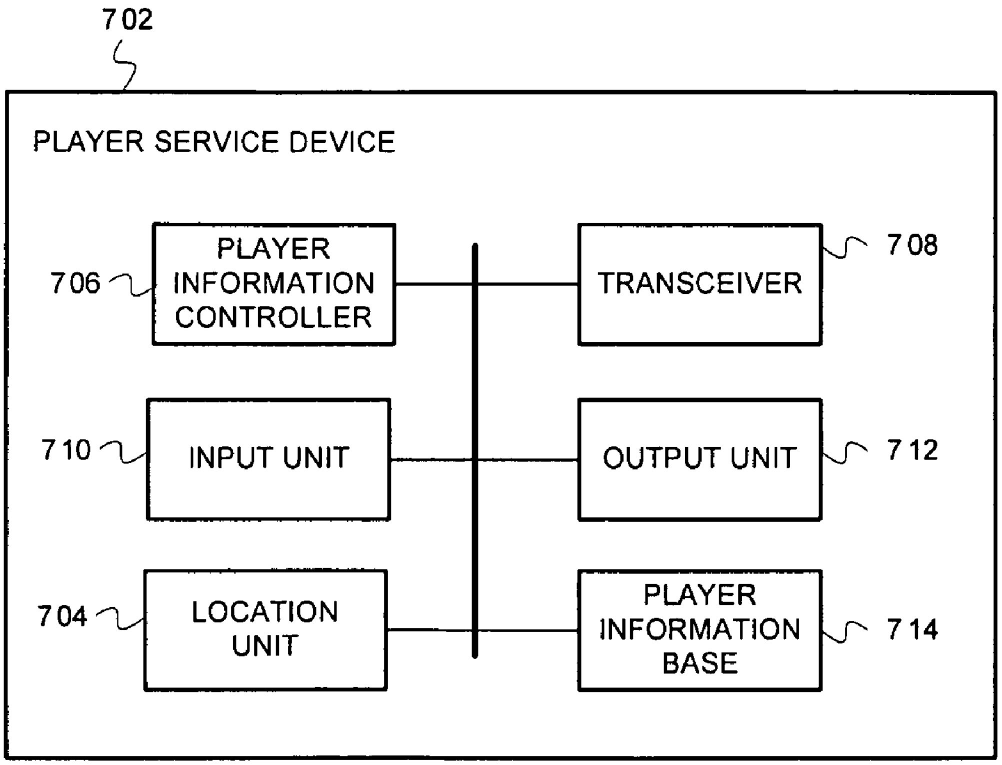
FIG. 7 is a block diagram illustrating a player service device architecture, according to some embodiments of the invention.

Casinos can use player service devices to provide personalized service to valued players. In some embodiments, players can carry player service devices that transmit information about the players' movements, activities, interactions, etc. Promotions servers can use the player information to determine when and where to dispatch casino staff or to provide other player services, such as providing directions, making reservations, taking drink orders, etc. FIG. 7 provides additional details about player services devices.

FIG. 7 is a block diagram illustrating a player service device architecture, according to some embodiments of the invention. In FIG. 7, a player service device 702 includes a player information base 714, location unit 704, player information controller 706, transceiver 708, input unit 710, and output unit 712. The player information base 714 can include information about a player, such as a player identifier and other personal and wagering-game-related information. The location unit 704 can track the location of the player service device 702 in a casino. The location unit 704 can include a GPS receiver, RFID device, or other device used for determining the player service device's location.

The player information controller 706 can transmit (wirelessly or over a wired connection) player information to a player information server. The player information can indicate movements about a casino, activities in a casino, services requested/received, etc. Furthermore, the player information controller 706 can provide player information to other wagering game network devices. The input unit 710 unit can include buttons, touch pads, microphones, etc., while the output unit 712 can include speakers, video devices, etc.

In some embodiments, players can use the player service device 702 to participate in live table wagering games (e.g., craps). For example, the player service device 702 can transmit betting information to a wagering game server that is monitoring the table game. The wagering game server can settle bets by crediting or debiting player accounts. The player information controller 706 can record and report player information indicating such live table gaming activities.

The player service device 702 can be a standalone device or it can be included in a cell phone, personal digital assistant, two-way pager, or other device. In some embodiments, the player service device 702 can be incorporated into a device used in playing wagering game machines.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 10:
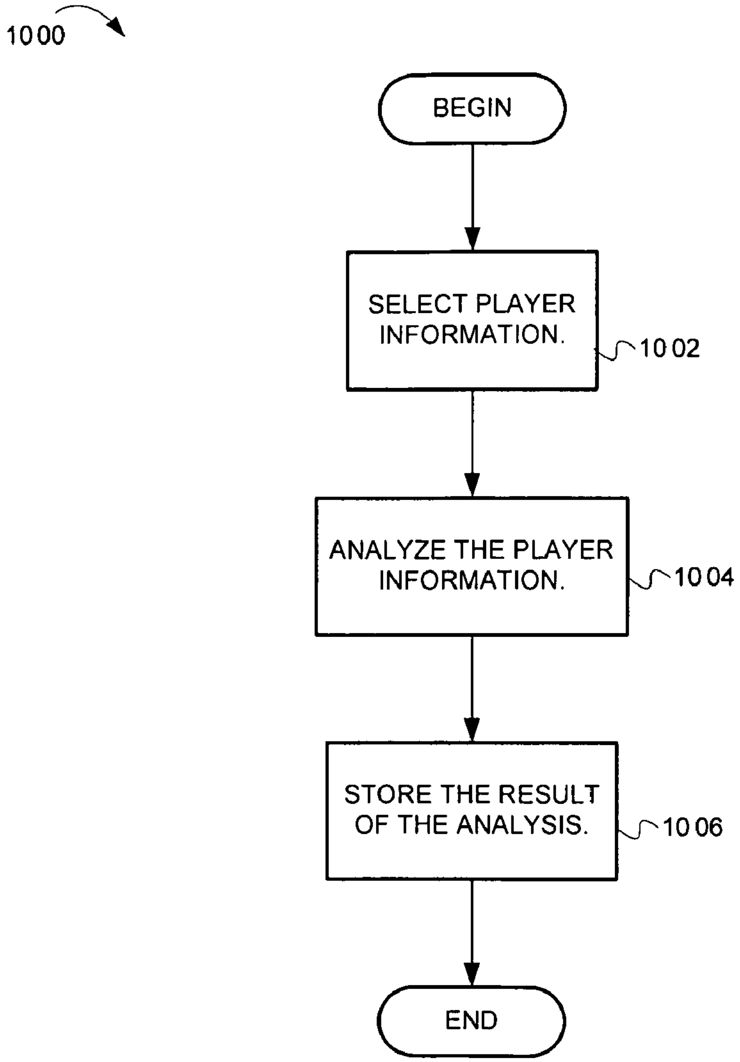
FIG. 10 is a flow diagram illustrating operations for analyzing player information, according to some embodiments of the invention.
Figure 11:
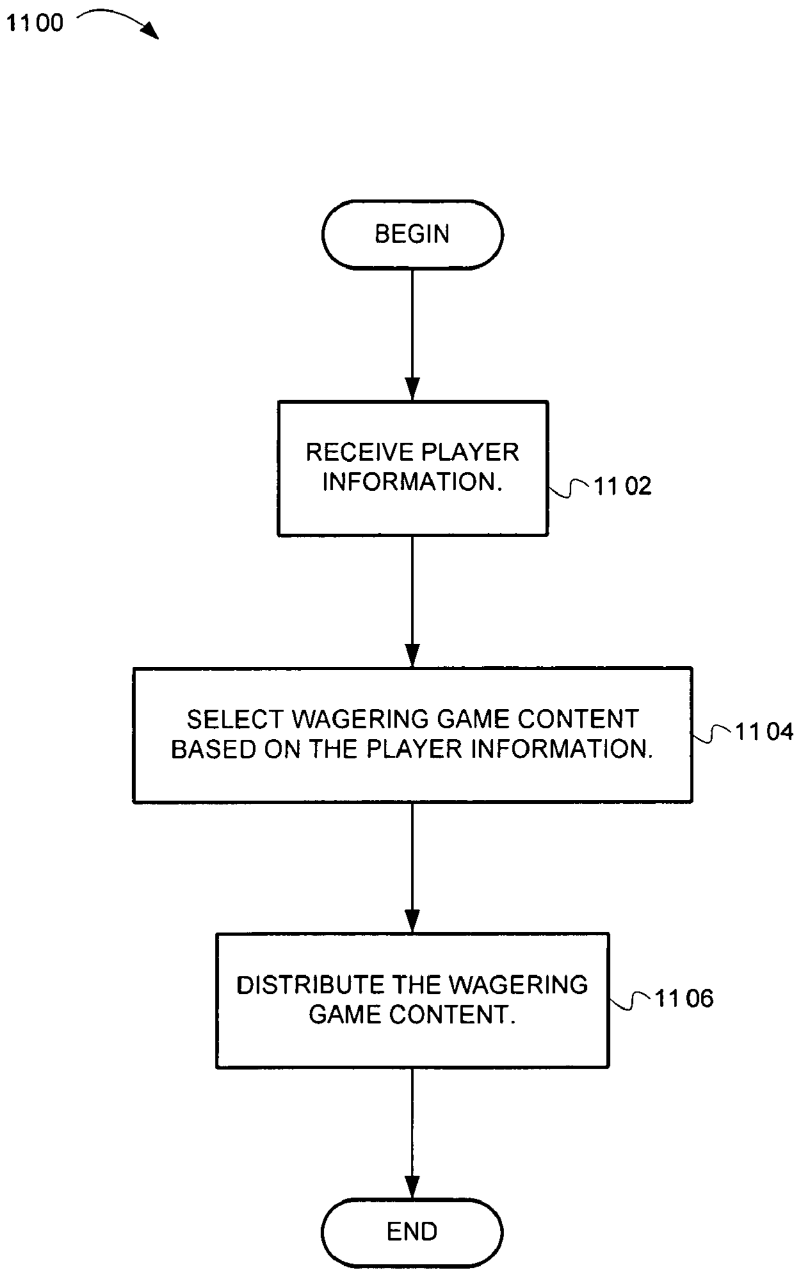
FIG. 11 is a flow diagram illustrating operations for using player information to select wagering game content, according to some embodiments of the invention.
Figure 12:
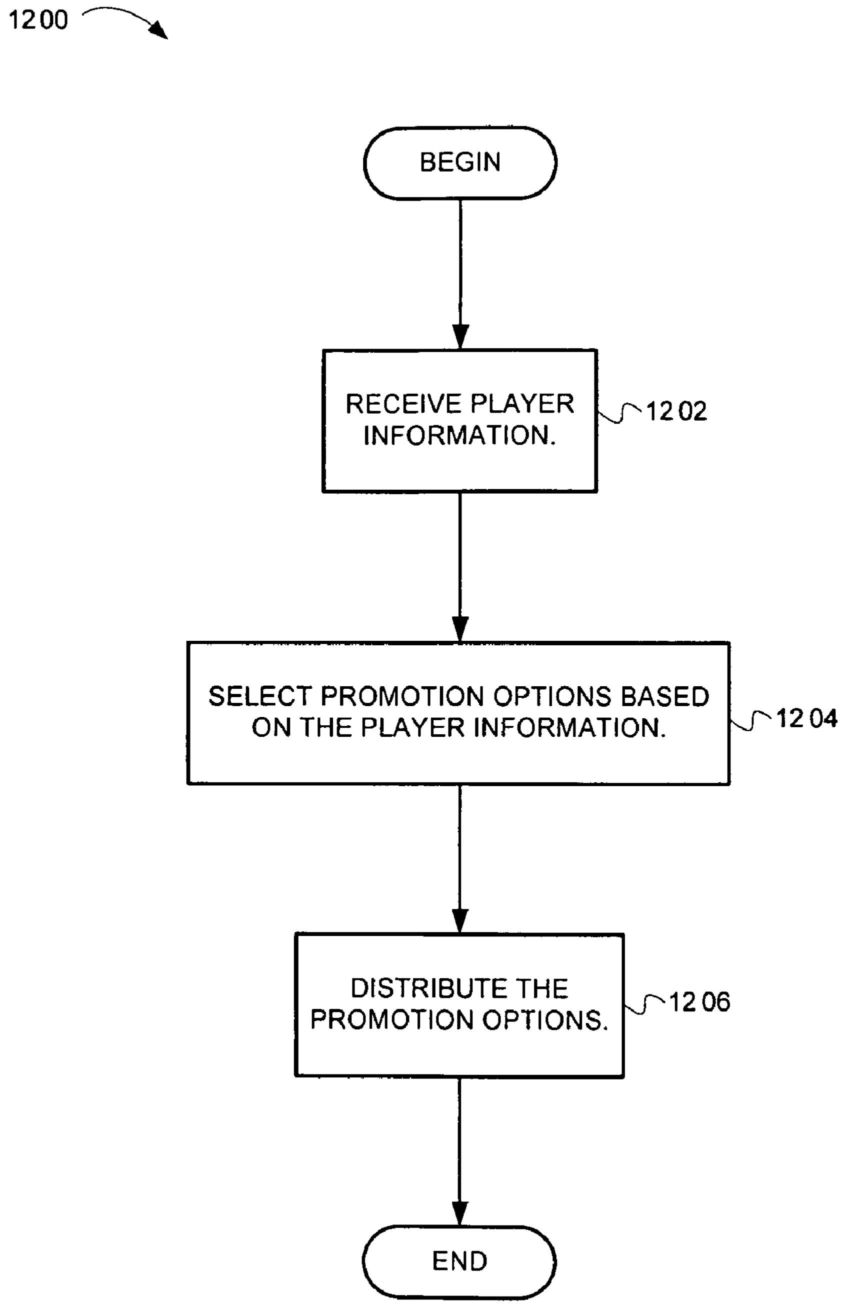
FIG. 12 is a flow diagram illustrating operations for using player information to select promotions, according to some embodiments of the invention.

In the following discussion, FIGS. 8 & 9 describe operations for storing, distributing, and presenting player information in a wagering game network. FIGS. 10-12 describe operations for analyzing and using player information to select wagering game content and promotions.

Storing & Distributing Player Information

Figure 8:
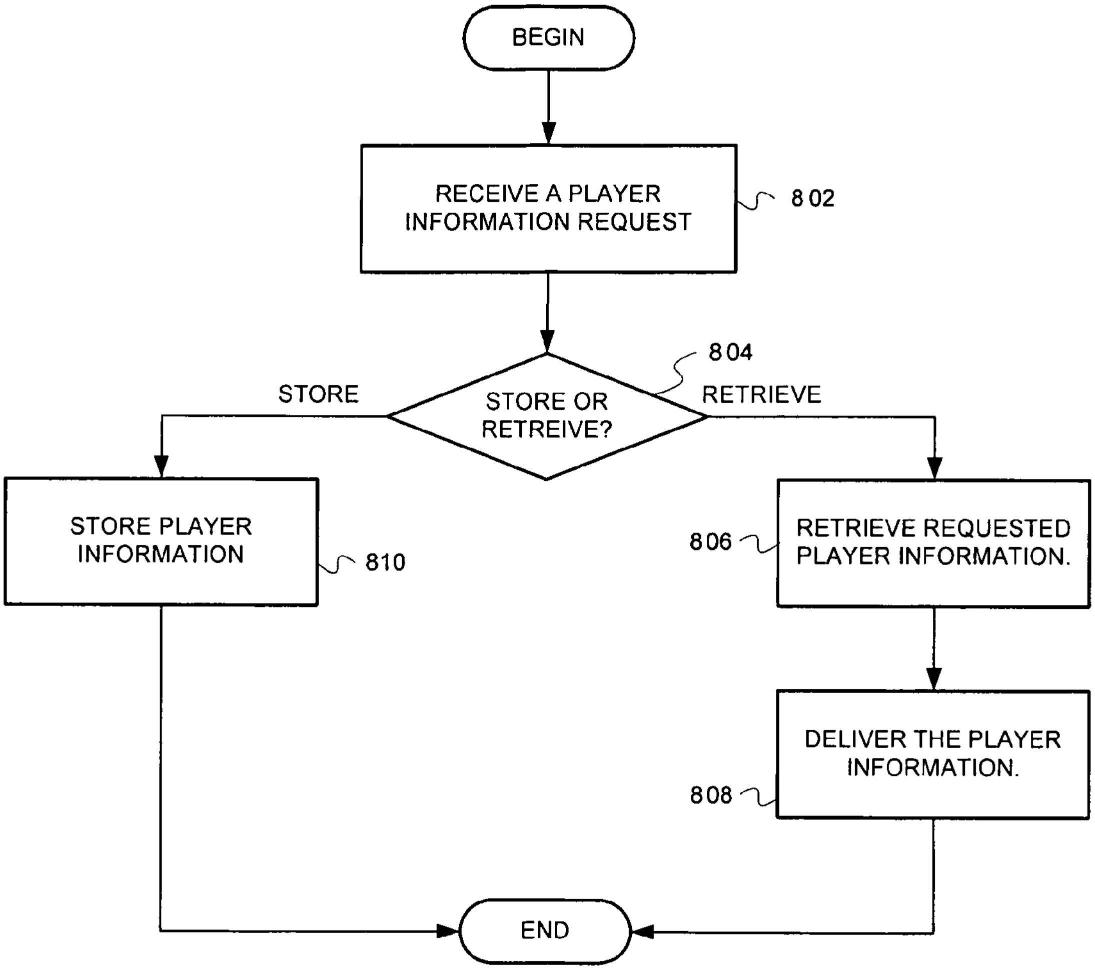
FIG. 8 is a flow diagram illustrating operations for receiving and distributing player information in a wagering game network, according to some embodiments of the invention.

FIG. 8 is a flow diagram illustrating operations for receiving and distributing player information in a wagering game network, according to some embodiments of the invention. The flow 800 will be described with reference to the wagering game network shown in FIG. 2. The flow 800 begins at block 802.

At block 802, a player information server's player information controller 304 receives a player information request. In some embodiments, player information requests can include requests for player information or requests to store player information. Requests for player information can ask for particular player information (e.g., a player's preferences for a specific wagering game, a player's movements in a casino, etc.). Requests to store player information can include player information collected at any wagering game network device (e.g., a wagering to a machine). The flow continues at block 804.

At block 804, the player information server's player information controller 304 determines whether the request is requesting storage or delivery of player information. If the request is to store player information, the flow continues at block 810. Otherwise, the flow continues at block 806.

At block 806, the player information controller 304 retrieves the requested player information from the player information base 308. For example, the player information controller 304 can retrieve player information indicating a player's favorite wagering games, drinks, etc. The flow continues at block 808.

At block 808, the player information controller 304 transmits the player information to the requester. In some embodiments, instead of transmitting player information directly to the requestor, the player information controller 304 transmits the player information to a data store accessible to the requestor. In some embodiments, the requestor will use the player information to select wagering game content, promotional content, in-casino services, etc. From block 808, the flow ends.

At block 810, the player information controller 304 stores the player information in the player information base 308. The player information controller 304 can associate the player information with players or other relevant player parameters. From block 810, the flow ends.

Presenting Player Information & Dashboards

In addition to storing and distributing player information (see above), some embodiments can present real-time player information. In some embodiments, a player information server, maintenance server, or other wagering game network device can present real-time player information in a graphical user interface, such as a digital dashboard. FIG. 9 describes one such dashboard.

Figure 9:
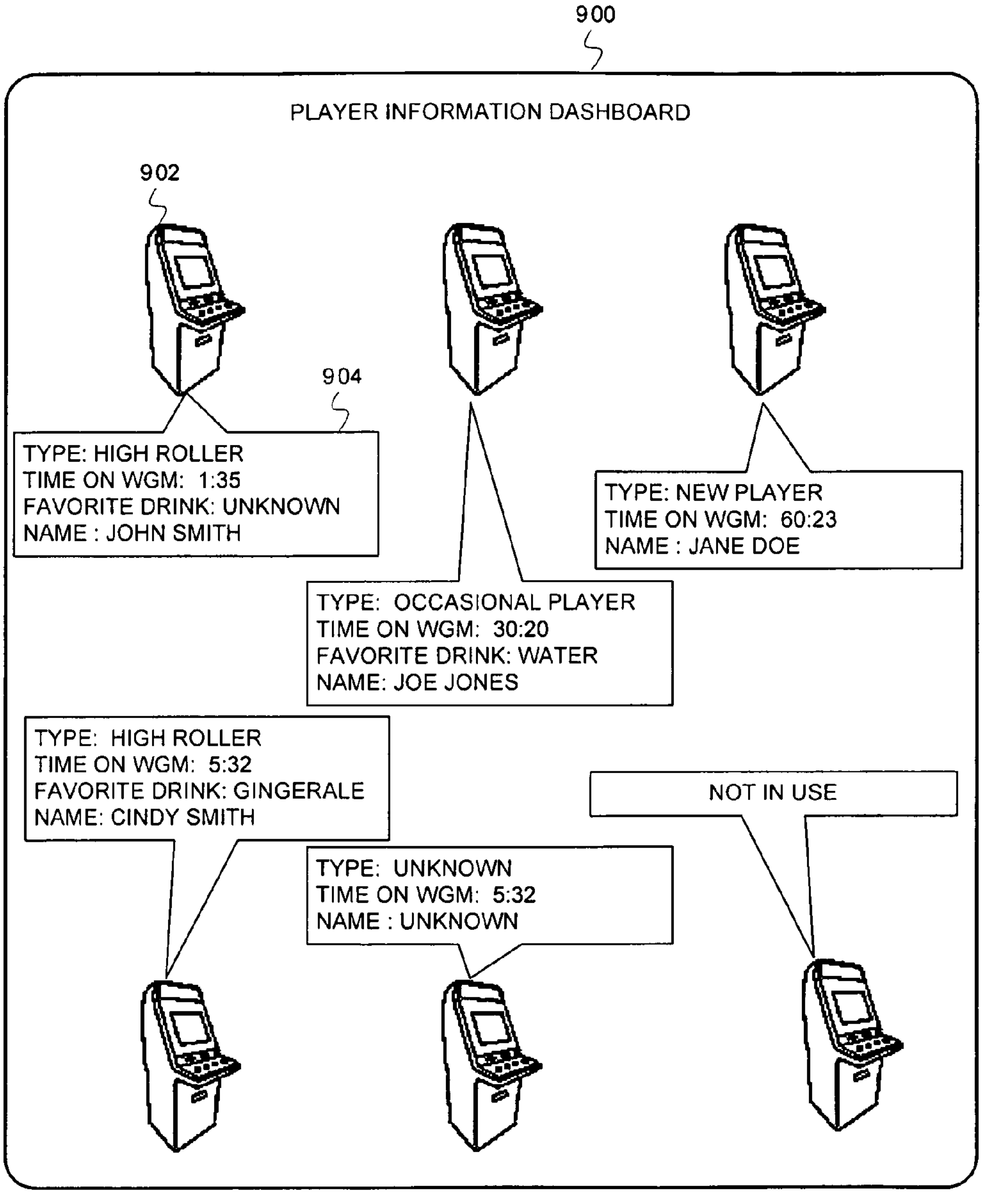
FIG. 9 illustrates a player information dashboard showing real-time player information about players on a casino floor, according to some embodiments of the invention.

FIG. 9 illustrates a player information dashboard showing real-time player information about players on a casino floor, according to some embodiments of the invention. In FIG. 9, the player information dashboard 900 shows a representation of a casino floor. The dashboard 900 shows wagering game machines 902 and balloons 904. Each balloon 904 includes real-time player information about a player who is playing the wagering game machine 902. In the embodiment shown in FIG. 9, the player information indicates the player's type, time the player has been playing the wagering a machine 902 (e.g., minutes and seconds), the player's favorite drink, and the player's name. Casino attendants can use the real-time player information to select and deliver in-person services, such as delivering drinks. Moreover, casino attendants can devise promotions that are likely to appeal to the players.

In some embodiments, the balloons 904 can include any suitable player information, such as player information indicating: 1) whether a player has a friend/acquaintance relationship with others in a casino (see below), 2) whether the player has an influence relationship with others in the casino (see below), 3) the player's favorite wagering games, 4) total bets in a certain time period, 5) etc. In some embodiments, the player information dashboard can employ other graphics to represent real-time player information (e.g., pop-up windows, icons, color coded text, photos, etc.).

While FIGS. 8 & 9 describe operations for storing, presenting, and distributing player information, the discussion continues with techniques for analyzing player information.

Analyzing Player Information

Player information servers can analyze player information using any suitable analysis technique. For example, some player information servers can analyze player information using regression analysis, factor analysis, cluster analysis, and other data analysis techniques. Some embodiments can analyze player information to determine many different relationships. Some relationships include:

- Friend/Acquaintance Relationships—Player information can indicate whether certain players know each another. For example, if player information indicates that a group of players are often in a casino contemporaneously and in close proximity, the player information server may deduce that the players know each other. Some embodiments can identify friend/acquaintance relationships with higher certainty by offering promotions (e.g., coupons) that must be given to friends. If a player redeems a promotion that was originally awarded to another player, the player information server may deduce a friend/acquaintance relationship between the players. In some embodiments, the player information server may deduce a friend/acquaintance relationship based on explicit information, such as a player's "friend list."

Influence Relationships—Player information can indicate whether certain players have influence on other players. For example, if player information indicates that a player deviates from typical behavior (e.g., the player bets differently, plays different wagering games, plays in different casinos, etc.) when another player is in proximity, the player information server may conclude that an influence relationship exists between the players.

Player Aspirations—Player information can indicate certain player aspirations. For example, if player information indicates that a player typically bets very conservatively yet tries to win large jackpots, the player information server may deduce that the player has high aspirations. Conversely, if player information indicates that a player bets very aggressively, but does not often try to win large jackpots, the player information server may deduce that the player does not have high aspirations. Other player information can indication other player aspirations.

Player Interests & Tendencies—Player information can suggest that certain players have certain interests. For example, if a large number of players who participate in a certain activity also frequently play a particular wagering game, the player information server may deduce that a new player who participates in the activity will likely play the particular wagering game frequently. Other activities can indicate other player interests and tendencies.

In some embodiments, player information analysis can reveal one or more of the above-noted relationships in addition to numerous other relationships. This section continues with operations for analyzing player information.

FIG. 10 is a flow diagram illustrating operations for analyzing player information, according to some embodiments of the invention. The flow 1000 begins at block 1002.

At block 1002, the player information server's player information analyzer 310 selects player information in the player information base 308. The analyzer 310 can select player information associated with one or more players, one or wagering games, one or more player demographics, promotions, services, etc. The flow continues at block 1004.

At block 1004, the player information analyzer 310 analyzes the player information. In some embodiments, the analysis identifies relationships, correlations, and other statistical factors in the player information. Results of the analysis can identify activities, wagering game content, and services to offer players. The analysis can identify relationships between players (e.g., influence and friend/acquaintance relationships). In some embodiments, the analysis considers external factors such as weather conditions, events (e.g., conventions, professional sporting events, etc.), traffic patterns, etc. in identifying activities, wagering game content, services, etc. to offer players.

At block 1006, the player information analyzer 310 stores results of the analysis in the player information base 308. In some embodiments, the analyzer 310 stores the analysis results in the form of player information; thus, the analyzer 310 can use the analysis results in future analyses.

This section continues with a description of operations for using player information to select wagering game content and promotions.

Using Player Information to Select Game Content & Promotions

FIG. 11 is a flow diagram illustrating operations for using player information to select wagering game content, according to some embodiments of the invention. The flow 1100 begins at block 1102.

At block 1102, a wagering game server 220 receives player information from the player information server 216. In some embodiments, the player information is received as a result of a player initiating a game session on a wagering game machine 202. Players can initiate game sessions by identifying themselves via a player card, player tracking device, log-in identifier, etc. The player information can indicate a player's favorite wagering games, betting preferences, favorite themes, online friends, and other information. The flow continues at block 1104.

At block 1104, a wagering game server 220 selects wagering game content based on the player information. In some embodiments, the wagering game server 220 selects wagering game content that comports with one or more of the player's preferences. The flow continues at block 1106.

At block 1106, the wagering game server 220 distributes the wagering game content to wagering game machine 202. In some embodiments, the wagering game server 220 makes the selected content accessible at the wagering game machine 202, where further interaction with the server 220 is necessary for presenting the content (e.g., the wagering game machine 202 is a thin client). In other embodiments, the wagering game server 220 downloads the wagering game content to the wagering game machine 202 for execution without further interaction with the server 220. From block 1108, the flow ends.

FIG. 12 is a flow diagram illustrating operations for using player information to select promotions, according to some embodiments of the invention. The flow 1200 begins at block 1202.

At block 1202, a promotions server 218 receives player information from the player information server 216. In some embodiments, the promotions server 218 requests player information, while in other embodiments, the promotions server 218 receives player information without requesting it (e.g., the player information server 216 periodically publishes player information). The flow continues at block 1204.

At block 1204, the promotions server 218 selects promotions based on the player information. In some embodiments, the wagering game server 220 selects promotions that comport with one or more preferences indicated in the player information. For example, if the player information indicates that a player frequently books show tickets through the casino, the promotions server 218 can select a promotion that offer discount show tickets. The flow continues at block 1206.

At block 1206, the promotions server 218 distributes the promotion one or more wagering game network devices accessible to the player. For example, the promotions server 218 offers the promotion to the player via a wagering game machine 202 and/or the community server 222. From block 1208, the flow ends.

While FIGS. 11 and 12 describe using player information to select wagering game content and promotions, embodiments are not limited to those uses of player information. Any component of a wagering game network can use player information to make choices about services, content, promotions, activities, or any other factor affecting online and casino gaming experiences.

More About Wagering Game Machines

Figure 13:
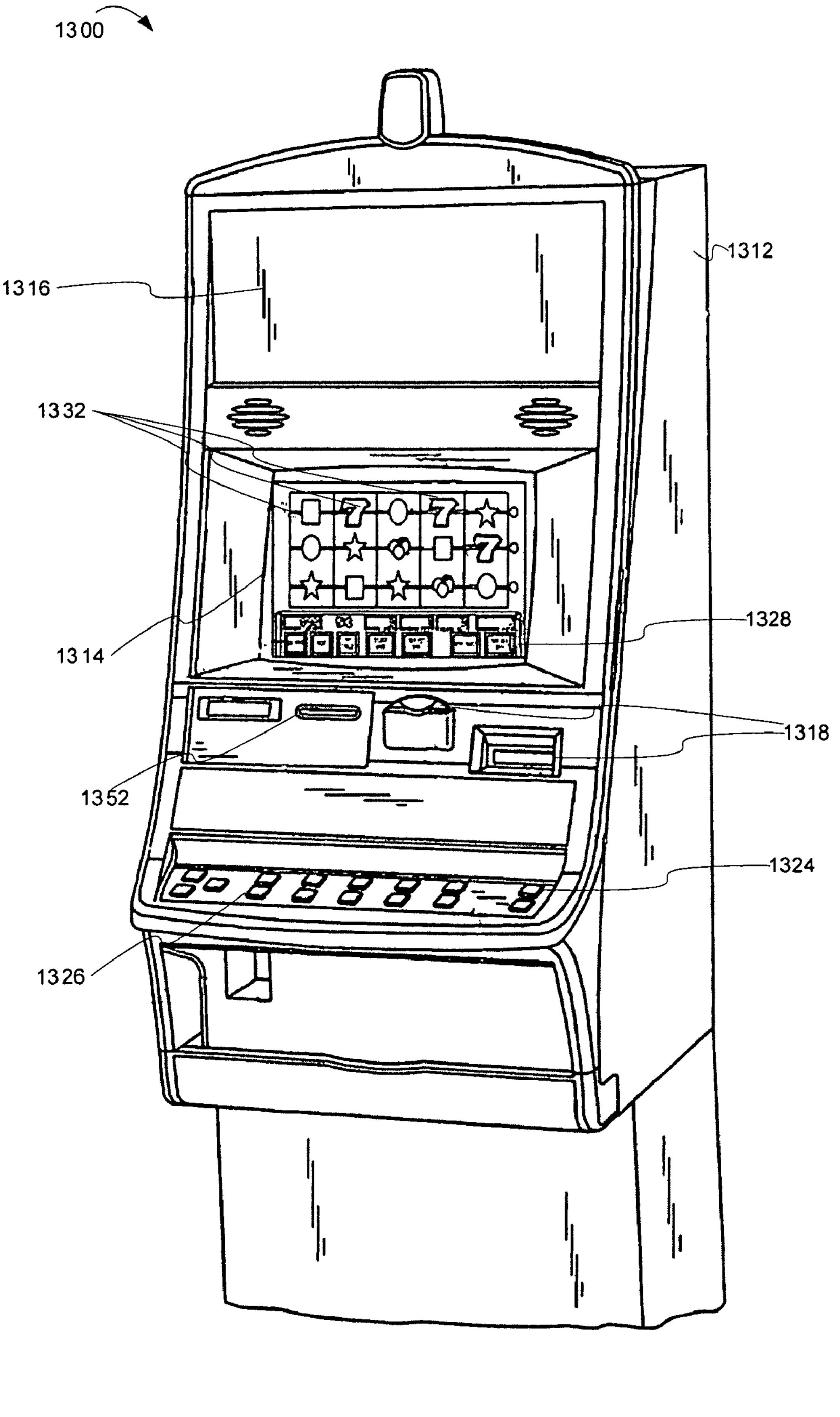
FIG. 13 is a perspective view of a wagering game machine, according to example embodiments of the invention.

FIG. 13 is a perspective view of a wagering game machine, according to example embodiments of the invention. Referring to FIG. 13, a wagering game machine 1300 is used in gaming establishments, such as casinos. According to embodiments, the wagering game machine 1300 can be any type of wagering game machine and can have varying structures and methods of operation. For example, the wagering game machine 1300 can be an electromechanical wagering game machine configured to play mechanical slots, or it can be an electronic wagering game machine configured to play video casino games, such as blackjack, slots, keno, poker, blackjack, roulette, etc.

The wagering game machine 1300 comprises a housing 1312 and includes input devices, including value input devices 1318 and a player input device 1324. For output, the wagering game machine 1300 includes a primary display 1314 for displaying information about a basic wagering game. The primary display 1314 can also display information about a bonus wagering game and a progressive wagering game. The wagering game machine 1300 also includes a secondary display 1316 for displaying wagering game events, wagering game outcomes, and/or signage information. While some components of the wagering game machine 1300 are described herein, numerous other elements can exist and can be used in any number or combination to create varying forms of the wagering game machine 1300.

The value input devices 1318 can take any suitable form and can be located on the front of the housing 1312. The value input devices 1318 can receive currency and/or credits inserted by a player. The value input devices 1318 can include coin acceptors for receiving coin currency and bill acceptors for receiving paper currency. Furthermore, the value input devices 1318 can include ticket readers or barcode scanners for reading information stored on vouchers, cards, or other tangible portable storage devices. The vouchers or cards can authorize access to central accounts, which can transfer money to the wagering game machine 1300.

The player input device 1324 comprises a plurality of push buttons on a button panel 1326 for operating the wagering game machine 1300. In addition, or alternatively, the player input device 1324 can comprise a touch screen 1328 mounted over the primary display 1314 and/or secondary display 1316.

The various components of the wagering game machine 1300 can be connected directly to, or contained within, the housing 1312. Alternatively, some of the wagering game machine's components can be located outside of the housing 1312, while being communicatively coupled with the wagering game machine 1300 using any suitable wired or wireless communication technology.

The operation of the basic wagering game can be displayed to the player on the primary display 1314. The primary display 1314 can also display a bonus game associated with the basic wagering game. The primary display 1314 can include a cathode ray tube (CRT), a high resolution liquid crystal display (LCD), a plasma display, light emitting diodes (LEDs), or any other type of display suitable for use in the wagering game machine 1300. Alternatively, the primary display 1314 can include a number of mechanical reels to display the outcome. In FIG. 13, the wagering game machine 1300 is an "upright" version in which the primary display 1314 is oriented vertically relative to the player. Alternatively, the wagering game machine can be a "slant-top" version in which the primary display 1314 is slanted at about a thirty-degree angle toward the player of the wagering game machine 1300. In yet another embodiment, the wagering game machine 1300 can exhibit any suitable form factor, such as a free standing model, bartop model, mobile handheld model, or workstation console model.

A player begins playing a basic wagering game by making a wager via the value input device 1318. The player can initiate play by using the player input device's buttons or touch screen 1328. The basic game can include arranging a plurality of symbols along a payline 1332, which indicates one or more outcomes of the basic game. Such outcomes can be randomly selected in response to player input. At least one of the outcomes, which can include any variation or combination of symbols, can trigger a bonus game.

In some embodiments, the wagering game machine 1300 can also include an information reader 1352, which can include a card reader, ticket reader, bar code scanner, RFID transceiver, or computer readable storage medium interface. In some embodiments, the information reader 1352 can be used to award complimentary services, restore game assets, track player habits, etc.

GENERAL

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Some embodiments of the invention can include any combination of features described above. While some embodiments are not shown, they are included within the inventive subject matter, as logical, mechanical, electrical, and other changes can be made to the example embodiments described herein. Features of various embodiments described herein, however essential to some example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computer-implemented method for electronically disseminating player information in a wagering game network, the method comprising:

receiving, in a player information server, a first set of player information indicating wagering game activities in a real-world casino, wherein the wagering game activities are associated with a player;

storing the first set of player information in a database in the player information server;

analyzing the first set of player information and a second set of player information to determine preferences and tendencies associated with the player, wherein the second set of player information indicates the player's non-gaming activities in a virtual community; and providing an indication of the preferences and tendencies to devices in the wagering game network.

2. The computer-implemented method of claim 1, wherein the non-gaming activities include monitoring social contacts in real-world casinos.

3. The computer-implemented method of claim 1, further comprising analyzing the first set to determine that the player has an acquaintance relationship with another player.

4. The computer-implemented method of claim 3, further comprising:

awarding a transferable promotional offer to the player, wherein the promotional offer is redeemable only if transferred to the other player.

5. The computer-implemented method of claim 1, wherein the analyzing uses one or more of the group consisting of factor analysis, regression analysis, and cluster analysis.

6. The computer-implemented method of claim 1, wherein the first set of player information is received from a wagering game machine residing in the real-world casino.

7. The computer-implemented method of claim 1, wherein the devices include one or more of a promotions server, a wagering game server, a management server, and a community server.

8. A wagering game network comprising:

wagering game machines configured to provide a first set of player information, wherein the first set of player information indicates choices made by players during wagering games in one or more casinos;

a community server configured to host social networks comprising the players, and to provide a second set of player information, wherein the second set of player information indicates the players' activities in virtual communities and relationships between the players; and a player information server configured to determine, based on the first and second sets of player information, wagering game preferences associated with the players and relationships between certain of the players, and to distribute, to one or more other devices on the wagering game network, a third set of player information indicating the wagering game preferences and the relationships between certain of the players; and a promotions server configured to receive the third set of information and to create promotions for the players based on the third set of player information, wherein the promotions include offers redeemable by playing more wagering games in the one or more casinos.

9. The wagering game network of claim 8, wherein the second set of player information further indicates influence relationships between the players.

10. The wagering game network of claim 8 further comprising:

a player service device configured to provide additional player information to the player information server; and present a player information dashboard showing real-time player information about one or more of the players at one or more of the wagering game machines, wherein the real-time player information indicates preferences of the one or more of the players.

11. The wagering game network of claim 8 further comprising:

a wagering game server configured to provide wagering game content to the wagering game machines based on the preferences and relationships.

12. The wagering game network of claim 8, wherein the promotions include one or more of electronic coupons, wagering game betting options, and in-person casino services.

13. The wagering game network of claim 8, wherein the relationships include one or more of friend relationships and influence relationships.

14. The wagering game network of claim 8, wherein the first set of player information also indicated movements of one or more of the players in the one or more casinos.

15. A machine readable storage device including instructions executable by a machine, the instructions to electronically disseminate player information in a wagering game network, the instructions comprising:

instructions to receive, in a player information server, a first set of player information indicating wagering game activities in a real-world casino, wherein the wagering game activities are associated with a player;

instructions to store the first set of player information in a database in the player information server;

instructions to analyze the first set of player information and a second set of player information to determine preferences and tendencies associated with the player, wherein the second set of player information indicates the player's game-playing activities in a virtual community; and instructions to provide an indication of the preferences and tendencies to devices in the wagering game network.

16. The machine-readable medium of claim 15, wherein the non-gaming activities include one or more of responding to promotional offers in the virtual community, communicating to social contacts in the virtual community, and monitoring social contacts in real-world casinos.

17. The machine-readable medium of claim 15, further comprising:

instructions to analyze the first and second sets to determine that the player has an influence relationship with another player.

18. The machine-readable medium of claim 17, further comprising:

instructions to award a transferable promotional offer to the player, wherein the promotional offer is redeemable only if transferred to the other player.

19. The machine-readable medium of claim 15, wherein the instructions to analyze perform one or more of factor analysis, regression analysis, and cluster analysis.

20. A computer-implemented method for analyzing information about players in a wagering game network, the method comprising:

receiving, in a player information server on the wagering game network, a first group of information indicating the players' wagering game activities in a real-world casino, and a second group of information indicating the players' activities in a virtual community;

analyzing, in the player information server, the first and second groups of information to identify influence relationships between the players, and to identify aspirations of the players;

transmitting other groups of information indicating the influence relationships between the players and the aspirations of the players.

21. The computer-implemented method of claim 20, further comprising:

determining that certain of the players are playing wagering games in the real-world casino;

receiving one or more of the other groups of information;

presenting, based on the one or more other groups of information, graphics indicating the influence relationships and aspirations associated with the certain of the players.

22. The computer-implemented method of claim 20, wherein the influence relationships indicate how some of the players influence others of the players to deviate from typical behavior.

23. The computer-implemented method of claim 20, wherein the aspirations indicate types of wagering game jackpots the players want to win.

* * * * *